(12) United States Patent
Ono et al.

(10) Patent No.: US 7,582,020 B2
(45) Date of Patent: Sep. 1, 2009

(54) BOOT FOR UNIVERSAL JOINT

(75) Inventors: Shigeyuki Ono, Ogasa-gun (JP);
Takashi Shimazu, Fujisawa (JP);
Yoshiaki Sugiura, Ogasa-gun (JP)

(73) Assignee: NOK Corporation, Tokyo (JP)

( * ) Notice: Subject to any disclaimer, the term of this patent is extended or adjusted under 35 U.S.C. 154(b) by 178 days.

(21) Appl. No.: 10/572,679

(22) PCT Filed: Sep. 16, 2004

(86) PCT No.: PCT/JP2004/013518

§ 371 (c)(1),
(2), (4) Date: Jan. 8, 2007

(87) PCT Pub. No.: WO2005/028898

PCT Pub. Date: Mar. 31, 2005

(65) Prior Publication Data

US 2007/0196165 A1    Aug. 23, 2007

(30) Foreign Application Priority Data

Sep. 19, 2003    (JP)    ............................. 2003-328368

(51) Int. Cl.
  F16D 3/26    (2006.01)
  F16D 3/84    (2006.01)
  F16J 15/52   (2006.01)

(52) U.S. Cl. .................. 464/111; 464/175; 464/904; 277/636

(58) Field of Classification Search .............. 464/111, 464/175, 905; 403/50, 51; 277/599, 560, 277/634, 635, 636
See application file for complete search history.

(56) References Cited

U.S. PATENT DOCUMENTS

| 5,529,538 A * | 6/1996 | Schulz et al. ............... 464/111 |
| 5,558,580 A * | 9/1996 | Okuyama .................... 464/175 |
| 6,089,574 A * | 7/2000 | Sadr et al. ................... 277/636 |
| 2002/0043772 A1* | 4/2002 | Huchet et al. ............... 277/634 |

FOREIGN PATENT DOCUMENTS

| JP | 58-44523 | 9/1956 |
| JP | 1-118227 | 8/1989 |
| JP | 6-24264 | 3/1994 |
| JP | 7-38808 | 7/1995 |
| JP | 2005-233398(A) | * 9/2005 ................. 464/111 |

* cited by examiner

*Primary Examiner*—Greg Binda
*Assistant Examiner*—Clifford J Louden
(74) *Attorney, Agent, or Firm*—Jacobson Holman PLLC (57) ABSTRACT

In a universal joint boot including a bellows part, a ring-shaped mounting part that is formed at one end of the bellows part and into which a cup for receiving one member of two members moving relatively to each other is inserted; and a seal that is formed toward the peripheral direction of the inner peripheral surface of the mounting part to which the cup is mounted, the inner peripheral surface has protrusions protruding toward the axial center of the ring-shaped mounting part and the height of the seal lip becomes lower from the bottom of the protrusion to a peak and width of the seal lip becomes wider from the bottom of the protrusion to the peak, whereby sealing performance can be improved.

2 Claims, 7 Drawing Sheets

FIG. 3A
SECTIONAL VIEW
ALONG A LINE A-A

FIG. 3B
SECTIONAL VIEW
ALONG A LINE B-B

FIG. 3C
SECTIONAL VIEW
ALONG A LINE C-C

FIG. 4A
SECTIONAL VIEW
ALONG A LINE A'-A'

FIG. 4B
SECTIONAL VIEW
ALONG A LINE B'-B'

FIG. 4C
SECTIONAL VIEW
ALONG A LINE C'-C'

⇩ AFTER BOOT IS MOUNTED ON CUP
⇩ AFTER BOOT IS MOUNTED ON CUP
⇩ AFTER BOOT IS MOUNTED ON CUP

FIG. 7B
PRIOR ART

BOOT FOR UNIVERSAL JOINT

This is a nationalization of PCT/JP2004/013518 filed 16 Sep. 2004 and published in Japanese.

FIELD OF THE INVENTION

The present invention relates to a boot for protecting a movable mechanism part and, in particular, to a universal joint boot for protecting the movable mechanism part of a universal joint in automobiles and industrial machines.

BACKGROUND OF THE INVENTION

Among conventional boots of this kind is a boot that includes a freely extendable and contractible bellows part, a large-diameter ring-shaped mounting part formed at one end in the axial direction of this bellows part, and a small-diameter ring-shaped mounting part formed at the other end in the axial direction, and is molded by blowing a material such as thermoplastic elastomer.

In the boot of this kind, the large-diameter mounting part is tightly fixed by one clamp on the outer peripheral surface of a shaft side end of one member of two members that can move relatively to each other and the small-diameter mounting part is tightly fixed by another clamp on the outer peripheral surface of a shaft of the other member.

With this, the bellows part can be flexibly deformed with the relative movement of the two members to prevent foreign matters from entering a movable mechanism part between the two members from outside and to prevent lubricating grease or the like filled in the movable mechanism part from leaking outside.

To be specific, there has been known a boot that is used for protecting a constant-velocity joint used for transmitting the driving force of an automobile. In the constant-velocity joint like this, the outside shape of the fixed part of a joint cup where the boot is fixed is not cylindrical but may be formed in the shape of a tripod that has three curved depressions. In this case, the inner periphery of the fixing part of the boot is formed in the shape of a tripod in accordance with the shape of the outer periphery of the fixing part of the cup and the outer periphery of the fixing part of the boot is formed in the shape of a cylinder. The outer periphery of the fixing part of the boot is fastened by a band, whereby the boot is fixed to the cup. At this time, three depressions formed in the outer periphery of the fixing part of the cup function as parts for preventing the boot from rotating with respect to the joint cup.

Figure 6:
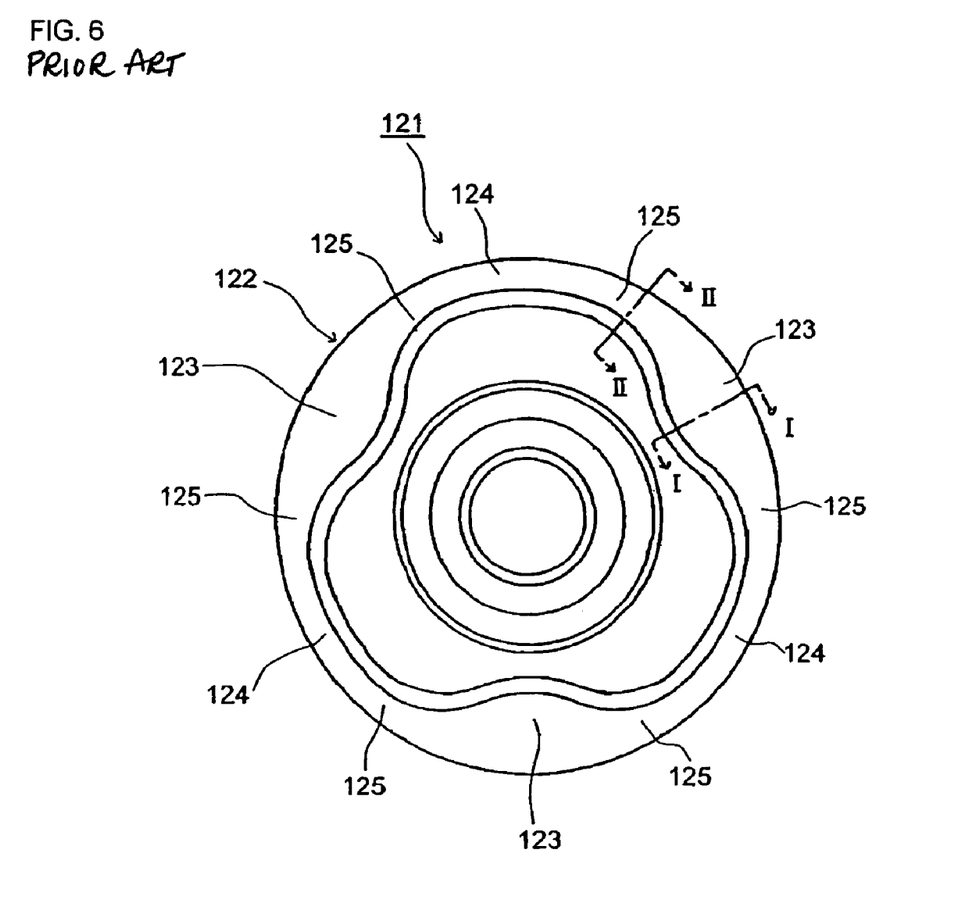
FIG. 6 is a front view of a conventional mechanical joint boot when viewed from an axial direction.

For example, Japanese Unexamined Utility Model Publication No. 1-118227 discloses a boot 121 in which a large-diameter ring part 122 is varied in thickness with respect to the cup formed in the shape of the above-described tripod in a state where the outer peripheral surface is kept in the shape of a ring and whose thick portions 123 are opposed to the depressions of the cup and whose thin portions 124 are opposed to the circumferential portions of the cup (see FIG. 6).

Figure 7A:
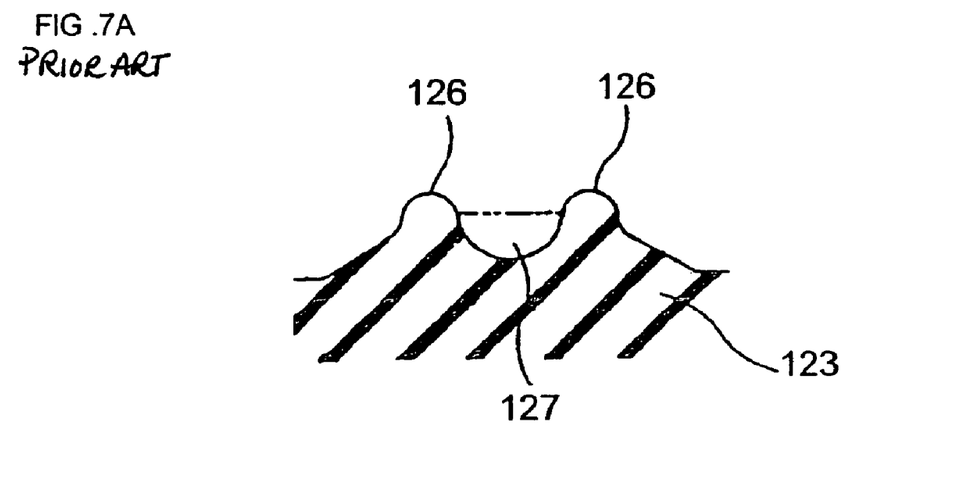
FIG. 7A is a sectional view along a line I-I of the boot shown in FIG. 6
Figure 7B:
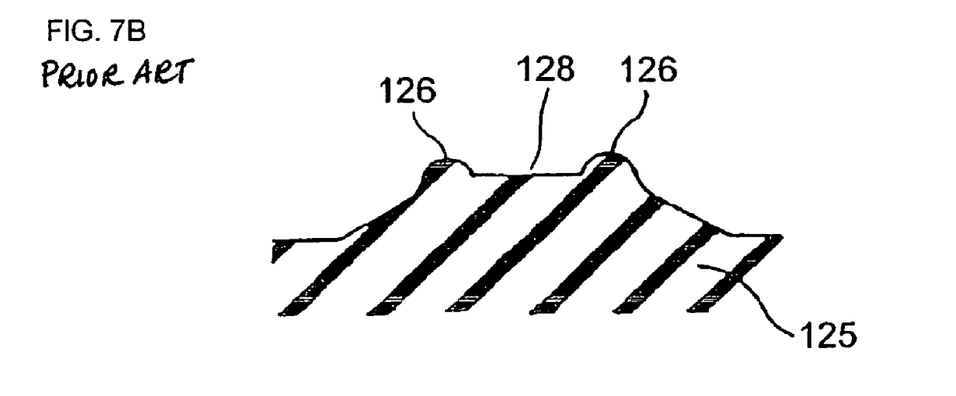
FIG. 7B is a sectional view along a line II-II of the boot shown in FIG. 6.

The boot 121 has two ribs 126 in the peripheral direction on the inner peripheral surface of the large-diameter ring part 122. A relief groove 127 is formed between the ribs 126 formed on the inner peripheral surface of each of the thick portions 123 (FIG. 7A). Further, a depression 128 formed between the ribs 126 in a connection portion 125 connecting the thin portion 124 and the thick portion 123 is formed in a shallower shape than the relief groove 127 in the thick portion 123 (FIG. 7B).

SUMMARY OF THE INVENTION

Problems that the Invention is to Solve

However, the related art described above presents the following problems.

That is, in recent years, transmission torque required of the joint increases and there is a tendency for also the bearing of the joint to increase in diameter with increasing transmission torque. For this reason, when a constant-velocity joint can not be increased in diameter, the curved depressions are required to be shallow, which presents a problem that the boot readily slides on the joint cup.

Further, when the boot is molded by blowing elastic plastic, the boot has poor dimensional accuracy in the inner periphery, in particular, in a non-cylindrical shape. For this reason, to bring the fixing part of the boot into close contact with the entire portion of the fixing part of the cup without a gap, it is necessary to enlarge the amount of fastening of band and to deform the boot heavily. However, this presents problems that the strength of the band needs to be increased and that the work efficiency is reduced when the boot is mounted on the cup.

Still further, when a gap is formed in the peripheral direction between the inner periphery of the boot and the outer periphery of the fixing part of the cup, it is necessary to deform the boot in the peripheral direction by fastening the band to eliminate the gap between the boot and the fixing part of the cup, whereby the cup is sealed. However, in the case of using a hard material such as elastic plastic, the boot can not be sufficiently deformed and hence the gap between the boot and the fixing part of the cup can not be eliminated, which results in presenting also a problem of making it impossible to exert sufficient sealing performance.

The present invention has been made to solve the problems of the related art. The object of the invention is to provide a boot for a universal joint having excellent sealing performance.

Means for Solving the Problems

To achieve the above object, the invention provides a universal joint boot including:

a cylindrical bellows part that has valleys and peaks formed continuously in a repetitive manner and can extend and contract;

a ring-shaped mounting part that is formed at one end of the bellows part and into which a case for receiving one member of two members moving relatively to each other is inserted; and a seal lip that is formed toward the peripheral direction of the inner peripheral surface of the mounting part to which the case is mounted, and is characterized in that the inner peripheral surface has protrusions protruding toward the axial center of the ring-shaped mounting part, and that the height of the seal lip becomes lower from a bottom of the protrusion to a peak and that the width of the seal lip becomes wider from the bottom of the protrusion to the peak.

According to this construction, in the bottom of the protrusion where a gap is comparatively readily produced between the case and the boot, the seal lip is easily deformed to improve sealing performance between the case and the boot.

Further, the invention is characterized in that when it is assumed that, of two surfaces forming the seal lip, one surface located on the side near the outside of the boot forms an angle θ1 with respect to the inner peripheral surface, and the other surface located on the side near the inside of the boot forms an angle θ2 with respect to the inner peripheral surface, and the angle θ1 is smaller than the angle θ2.

According to this construction, the surface pressure of the seal lip is not diffused also in a state where the boot is mounted on the case, so that higher sealing performance can be secured.

ADVANTAGE OF THE INVENTION

According to the invention, it is possible to provide a universal joint boot having excellent sealing performance.

BEST MODE FOR CARRYING OUT THE INVENTION

Hereafter, the best mode for carrying out this invention will be described in detail by way of example with reference to the drawings and embodiments. However, as for the size, material, shape, and relative arrangement of constituent parts described in these embodiments, it is not intended to limit the scope of this invention only to these unless otherwise specified. Further, the materials and shapes of parts once described in the following description are the same as those described in the beginning unless otherwise specified.

Figure 2:
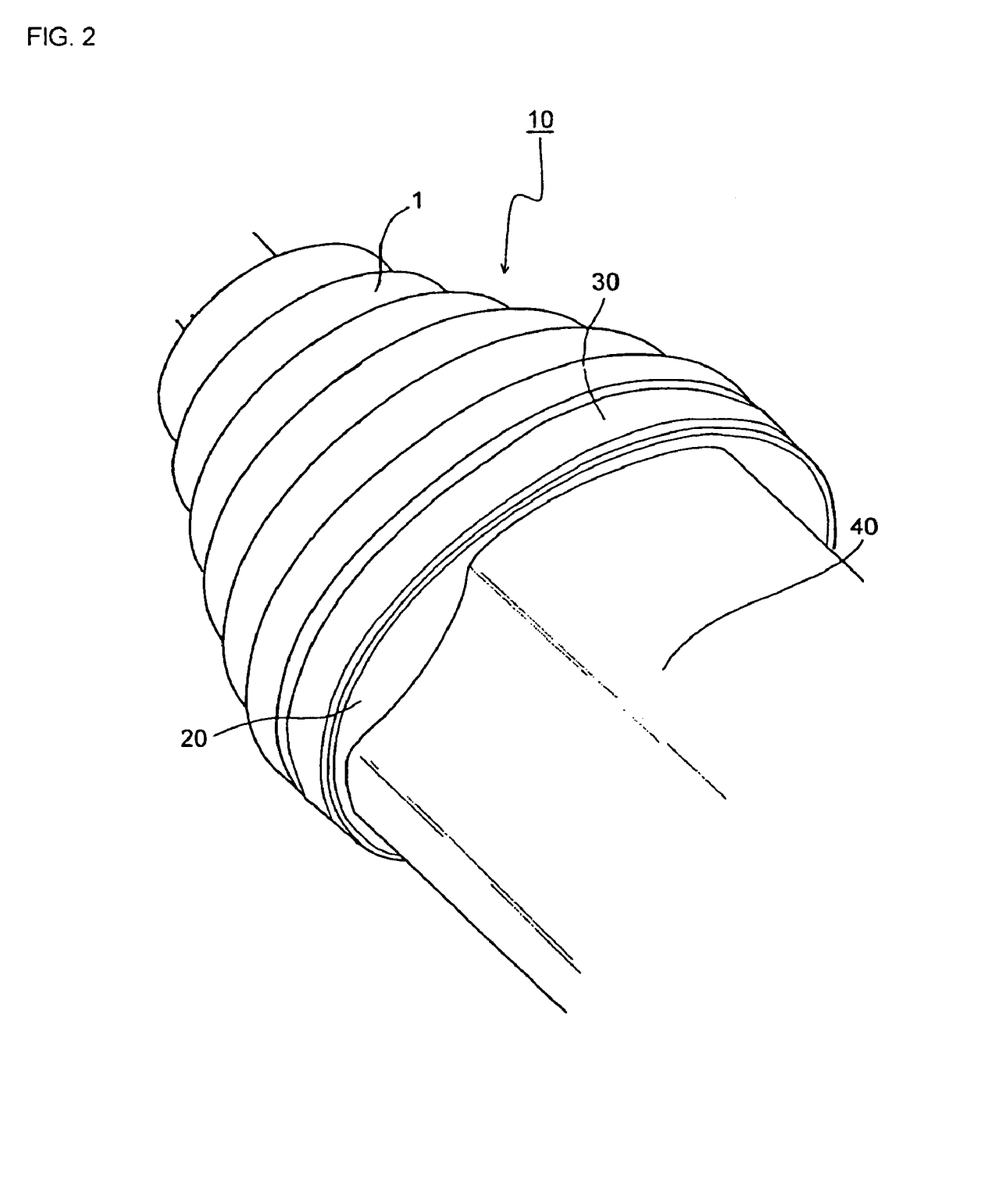
FIG. 2 is an external perspective view showing a state where the boot in accordance with this embodiment is mounted on a case.

First, a universal joint boot in accordance with this embodiment will be described with reference to FIG. 2. FIG. 2 is an external perspective view showing a state where a boot in accordance with this embodiment is mounted on a case.

A universal joint boot 1 used for a constant-velocity joint in accordance with this embodiment has a cylindrical bellows part 10 that has peaks and valleys formed continuously in a repetitive manner and can extend and contract and a large-diameter mounting part 20 that is provided at one end of the bellows part 10 and into which a case for receiving one member of two members moving relatively to each other is inserted. In the universal joint boot 1, the large-diameter mounting part 20 is fitted on the outer periphery of the opening of a joint cup (case) 40 for receiving the shaft of one member of the two members moving relatively to each other and is fixed to the cup 40 by a band 30.

Embodiment 1

Figure 1:
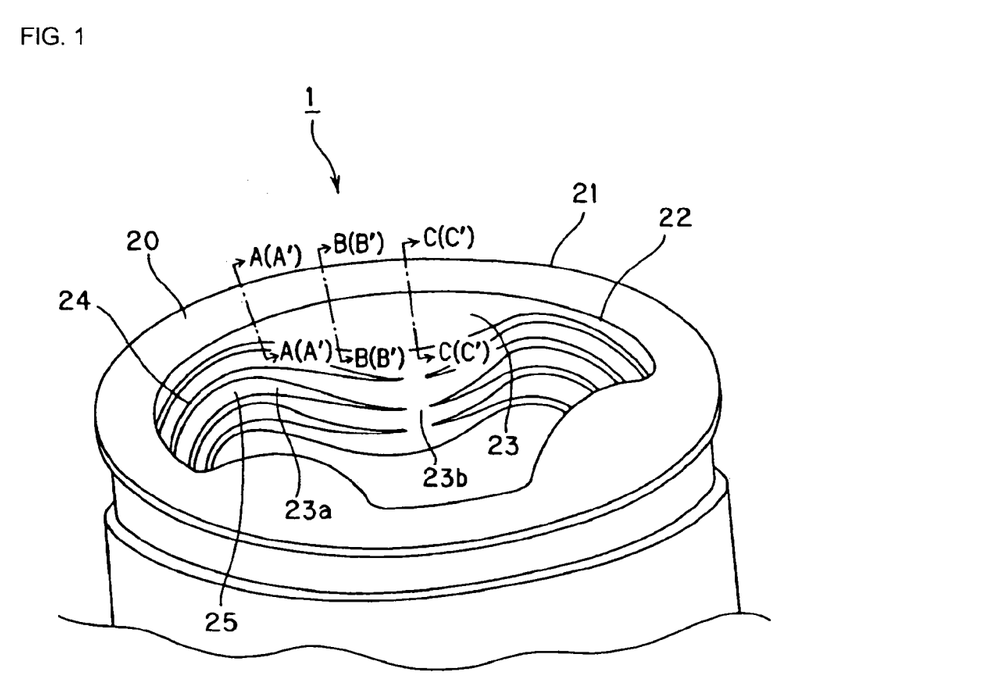
FIG. 1 is a schematic perspective view of a universal joint boot in accordance with embodiment 1 when viewed from its large-diameter mounting part side.
Figure 3A:
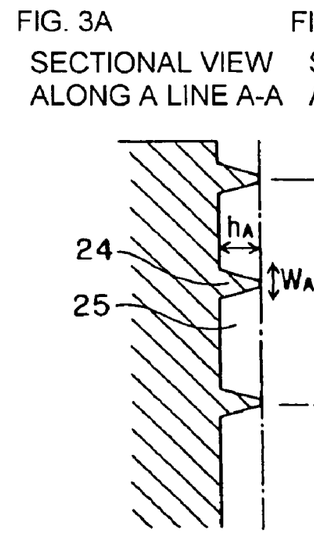
FIG. 3 shows a sectional view along a line A-A, a sectional view along a line B-B, and a sectional view along a line C-C in FIG. 1 of the universal joint boot in accordance with embodiment 1.
Figure 3B:
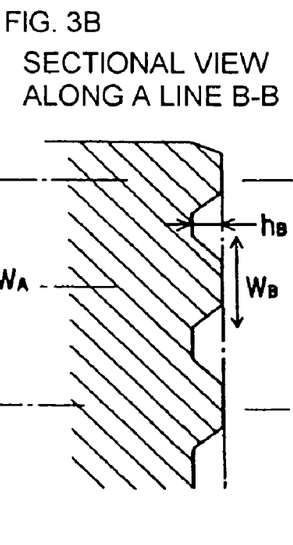
Figure 3C:
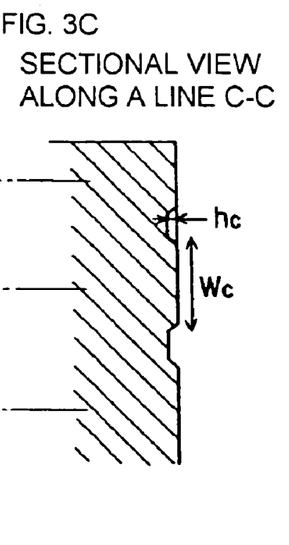

FIG. 1 is a schematic perspective view of a universal joint boot in accordance with embodiment 1 when viewed from its large-diameter mounting part side. FIG. 3 shows a sectional view along a line A-A, a sectional view along a line B-B, and a sectional view along a line C-C in FIG. 1.

As shown in FIG. 1, in the large-diameter mounting part 20, an outer peripheral surface 21 is formed in a circular shape and an inner peripheral surface 22 is formed in the shape of a tripod having three curved protrusions 23. Here, the protrusions 23 protrude toward the axial center of the mounting part. Further, the boot 1 in accordance with this embodiment is formed of rubber or elastic plastic. More preferably, it is recommendable to select rubber or synthetic resin suitable for molding.

A plurality of seal lips 24 are formed in the peripheral direction on the inner peripheral surface 22 of the large-diameter mounting part 20. Further, grooves 25 continuous in the peripheral direction are formed between the seal lips 24.

Further, the seal lip 24 varies in shape from the bottom 23a of the protrusion 23 to the peak 23b. FIG. 3 shows longitudinal sectional views of the seal lip 24 at different positions of the protrusion shown in FIG. 1.

The height of the seal lip 24 becomes lower from the bottom 23a of the protrusion 23 to the peak 23b and the width of the seal lip 24 becomes wider from the bottom 23a of the protrusion 23 to the peak 23b. To be more specific, the seal lip 24 is formed in such a way that, at the bottom 23a of the protrusion 23, a height hA is higher than the height hC of peak 23b and a width WA is narrower than the width WC of peak 23b (see FIGS. 3A, 3C). For this reason, the seal lip 24 is easily deformed at the bottom 23a of the protrusion 23 where a gap is readily comparatively produced between the cup 40 and the boot 1 to improve sealing performance between the cup 40 and the boot 1. On the other hand, at the peak 23b of the protrusion 23, the seal lip 24 is hard to deform to easily support the fastening force by the band 30.

Further, the seal lip opposed to portions where a gap is easily produced can be easily deformed and is hard to deform at portions where large fastening force is applied because a gap is hard to produce, so that the inner peripheral surface 22 can be formed in a shape to make the gap between the inner peripheral surface 22 and the outer peripheral surface of the cup 40 as small as possible. In particular, even if the boot 1 is made of a material hard to deform, its inner peripheral surface 22 can be formed in a shape meeting the shape in the peripheral direction of the mounting part of the cup 40, so that seal lips of the boot 1 can satisfy a function of preventing the boot 1 from rotating and at the same time can improve sealing performance. That is, at the time of designing the shape of the seal lip near the bottom 23b of the protrusion 23, it is possible to select a shape capable of keeping a function of preventing the boot 1 from rotating and satisfying sealing performance.

Here, it is recommendable to form a groove 25 over the entire periphery of the seal lip 24 so as to relieve the deformation of the seal lip 24 in the axial direction of the boot. With this, it is possible to improve workability without increasing a force at the time of fastening the band 30 more than required.

Embodiment 2

FIG. 4 shows a sectional view along a line A'-A', a sectional view along a line B'-B', and a sectional view along a line C'-C' in FIG. 1 of a universal joint boot in accordance with embodiment 2. Here, the universal joint boot in accordance with embodiment 2 is generally the same as the universal joint boot in accordance with embodiment 1 except for a seal lip 34 and a groove 35 to be described later, so that a general view is omitted.

A seal lip 34 varies in shape from the bottom 23a of the protrusion 23 to the peak 23b. FIG. 4 is a longitudinal sectional view at different positions of the protrusion shown in FIG. 1.

Figures 4A, 4B:
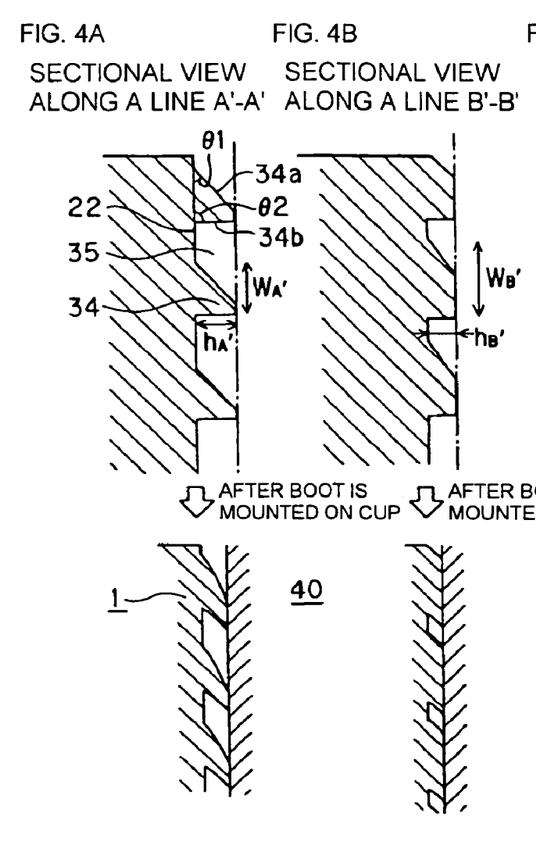
FIG. 4 shows a sectional view along a line A'-A', a sectional view along a line B'-B', and a sectional view along a line C'-C' in FIG. 1 of the universal joint boot in accordance with embodiment 2.
Figure 4C:
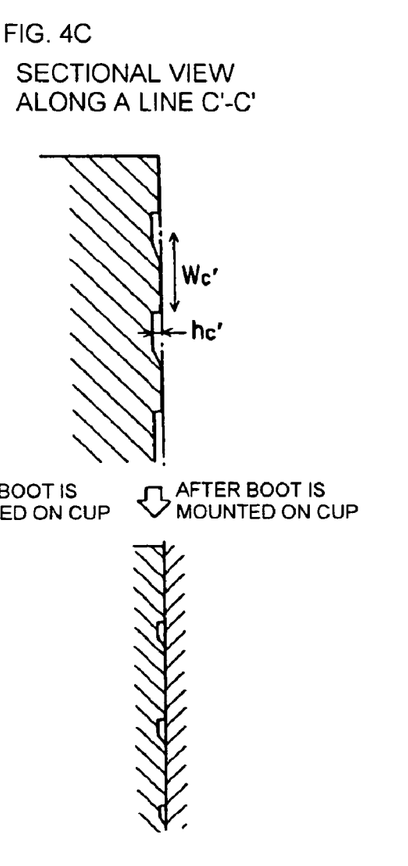

The seal lip 34 is formed in such a way that, at the bottom 23a of the protrusion 23, a height hA' is higher than the height hC' of peak 23b and a width WA' is narrower than the width WC' of peak 23b (see FIGS. 4A, 4C). For this reason, the seal lip 34 is easily deformed at the bottom 23a of the protrusion 23 where a gap is readily comparatively produced between the cup 40 and the boot 1 to improve sealing performance between the cup 40 and the boot 1. On the other hand, at the peak 23b of the protrusion 23, the seal lip 34 is hard to deform to easily support the fastening force by the band 30.

Further, usually, the seal lip is pressed onto a part mating with it by the fastening of the band 30, whereby its tip is deformed to exert sealing performance. However, the tip of the seal lip may be not deformed in the same direction, depending on the shape of the tip. In this case, the surface pressure of the seal lip is diffused and hence high sealing hermeticity can not be secured.

Hence, in this embodiment 2, the seal lip 34 is formed such that one side thereof near the outside of the boot 1 and the other side thereof near the inside of the boot 1 are asymmetrical in the sectional shape, so that the seal lip 34 is always deformed in a specific direction in a state where the boot 1 is mounted on the cup 40.

To be specific, for example, when it is assumed that, of two surfaces 34a, 34b forming the seal lip 34, a surface 34a located on the side near the outside of the boot 1 forms an angle $\theta 1$ with respect to an inner peripheral surface 22, and a surface 34b located on the side near the inside of the boot 1 forms an angle $\theta 2$ with respect to the inner peripheral surface 22, it is recommended that the angle $\theta 1$ is smaller than the angle $\theta 2$.

With this, the surface pressure of the seal lip 34 is not diffused in a state where the boot 1 is mounted on the cup 40. Hence, the seal lip 34 can secure higher sealing performance as compared with the seal lip 24 shown in embodiment 1. In addition, letting the condition of $\theta 1<\theta 2$, workability can be improved at the time of mounting the cup 40 on the boot 1 and sealing performance for grease or the like from inside of the boot 1 can be improved.

Embodiment 3

Figure 5:
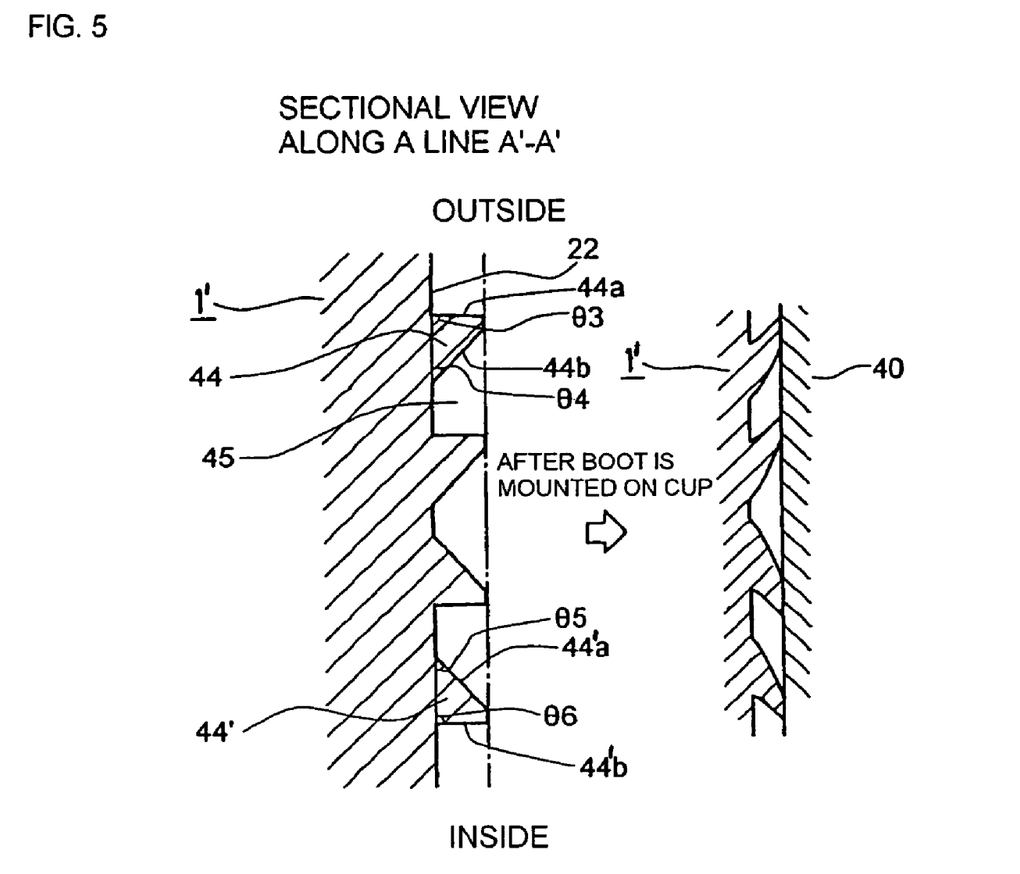
FIG. 5 shows a sectional view along a line A'-A' in FIG. 1 of the universal joint boot in accordance with embodiment 3.

FIG. 5 shows a sectional view along a line A'-A' in FIG. 1 of a universal joint boot in accordance with embodiment 3. Here, the universal joint boot in accordance with embodiment 3 is generally the same as the universal joint boot in accordance with embodiment 2 except for seal lips 44, 44' and a groove 45 to be described later, so that a general view is omitted.

The sectional shapes of the seal lips 44, 44' in accordance with embodiment 3 differ depending on whether its positions are on the side near the opening of the boot 1' or on the opposite side far from the opening of the boot 1' in the inner peripheral surface of the mounting part 20. To be more specific, the shape of the seal lip 44 located on the side near the opening of the mounting part 20 (outside of the boot 1') is different from the shape of the seal lip 44' located on the opposite side to the side near the opening (inside of the boot 1').

With this, it is possible to prevent fluid from leaking from inside of the boot 1' and to prevent fluid and foreign matters from entering from outside of the boot 1'.

More preferably, it is recommended that the seal lip 44 be formed in such a way that its tip is deformed toward the outside of the boot 1' in a state where the boot 1' is mounted on the cup 40. Further, similarly, it is also recommended that the seal lip 44' be formed in such a way that its tip is deformed toward the inside of the boot 1'.

To be more specific, for example, when it is assumed that, of two surfaces 44a, 44b forming the seal lip 44, a surface 44a located on the side near the outside of the boot 1' forms an angle $\theta 3$ with respect to an inner peripheral surface 22, and a surface 44b located on the side near the inside of the boot 1' forms an angle $\theta 4$ with respect to the inner peripheral surface 22, it is recommended that the angle $\theta 4$ is smaller than the angle $\theta 3$. Further, when it is assumed that, of two surfaces 44'a, 44'b forming the seal lip 44', a surface 44'a located on the side near the outside of the boot 1' forms an angle $\theta 5$ with respect to an inner peripheral surface 22, and a surface 44'b located on the side near the inside of the boot 1' forms an angle $\theta 6$ with respect to the inner peripheral surface 22, it is recommended that the angle $\theta 5$ is smaller than the angle $\theta 6$.

The invention claimed is:

1. A universal joint boot comprising:
   a cylindrical bellows part having valleys and peaks formed continuously in a repetitive manner and being extendible and contractible;
   a ring-shaped mounting part formed at one end of the bellows part and into which a case for receiving one member of two members moving relatively to each other is inserted; and
   a seal lip formed toward a peripheral direction of an inner peripheral surface of the ring-shaped mounting part to which the case is mounted,
   the inner peripheral surface having protrusions protruding toward an axial center of the ring-shaped mounting part, and a height of the seal lip becoming lower from a bottom of the protrusion to a peak and a width of the seal lip becoming wider from the bottom of the protrusion to the peak.

2. The universal joint boot as claimed in claim 1, wherein of two surfaces forming the seal lip, one surface of the two surfaces is located on a side near an outside of the boot and forms an angle $\theta 1$ with respect to the inner peripheral surface, and the other surface of the two surfaces is located on a side near an inside of the boot and forms an angle $\theta 2$ with respect to the inner peripheral surface, and the angle $\theta 1$ is smaller than the angle $\theta 2$.

* * * * *